United States Patent [19]

Leiber et al.

[11] Patent Number: 4,785,903
[45] Date of Patent: Nov. 22, 1988

[54] ARRANGEMENT FOR THE PROPULSION REGULATION OF MOTOR VEHICLES

[75] Inventors: Heinz Leiber, Oberriexingen; Hans Ohnemueller, Reutlingen; Klaus Kastner, Stuttgart, all of Fed. Rep. of Germany

[73] Assignee: Daimler-Benz Aktiengesellschaft, Stuttgart, Fed. Rep. of Germany

[21] Appl. No.: 136,955

[22] Filed: Dec. 23, 1987

[30] Foreign Application Priority Data

Dec. 23, 1986 [DE] Fed. Rep. of Germany ....... 3644138

[51] Int. Cl.$^4$ .............................................. B60K 31/00
[52] U.S. Cl. .................................................... 180/197
[58] Field of Search ................ 180/197; 123/351, 361; 364/426

[56] References Cited

U.S. PATENT DOCUMENTS 4,712,634 12/1987 Lindemann ......................... 180/197
4,722,411 2/1988 Ohashi ................................. 180/197

FOREIGN PATENT DOCUMENTS 3545546 7/1987 Fed. Rep. of Germany .

Primary Examiner—John A. Pekar
Attorney, Agent, or Firm—Barnes & Thornburg

[57] ABSTRACT

An arrangement for controlling the propulsion or forward drive in the sense of preventing an undesired slippage of the wheels to be regulated in motor vehicles equipped with four-wheel drive, in which a driving velocity-reference signal necessitated for the regulation is derived from the minimum wheel velocity and the reference velocity is set during each regulating cycle anew into the range of the optimum friction.

18 Claims, 2 Drawing Sheets

ARRANGEMENT FOR THE PROPULSION REGULATION OF MOTOR VEHICLES

BACKGROUND AND SUMMARY OF THE INVENTION

The present invention relates to an arrangement for controlling the propulsion or forward drive regulation of motor vehicles in the sense of the reduction of an undesired slippage of the wheels to be regulated in motor vehicles equipped with multi-axle drive.

An arrangement of this type has been proposed in German Pat. No. 35 45 546, in which for four-wheel drive vehicles with a drive slippage regulation (DSR), the signal of a vehicle longitudinal acceleration transmitter is used as a basis of the vehicle velocity reference control signal, which, however, makes relatively high demands as regards its evaluation.

It is the object of the present invention to so construct an arrangement of the aforementioned type wherein a reference signal can be formed without direct evaluation of a signal of a vehicle longitudinal acceleration transmitter.

The underlying problems are solved according to the present invention in that all of the velocity signals are obtained from the rotational speed signals from each of the four driven wheels and are fed to a device for the formation of a vehicle velocity reference signal, to a comparator circuit and also to a differentiating element. The reference signal is formed initially with a predetermined slope derived from a velocity signal corresponding to the minimum wheel velocity. The comparator circuit produces an output signal when a velocity signal exceeds the reference signal by a predetermined difference which initiates by way of an AND element, a first regulating cycle for reducing the driving torque of the vehicle engine at the adjusting element with a blocking signal at the output of a differentiating element when a negative acceleration value derived from the velocity signal exceeds a predetermined negative acceleration value which is fed to one inverting input of the AND element for controlling the adjusting element. The driving torque is kept constant during the regulating cycle phase of the negative acceleration, in that upon disappearance of the blocking signal—when dropping below the predetermined negative acceleration value—the adjusting element again increases the driving torque in the direction toward the value specified by the drive pedal. During the regulating cycle phase of negative acceleration, when the velocity signal drops below the reference-signal, the reference signal is now corrected in the reference signal-forming device to a velocity signal corresponding to a mimimum wheel velocity with a new slope for the following regulating cycle. Accordingly, a control of the driving torque is so selected that the wheel is guided during the regulation cycle in such a manner after termination of the regulation cycle, the stable range is reached. The reference velocity is thus set during each regulating cycle into the range of the optimum friction by the derivation of the reference velocity from the minimum wheel velocity.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
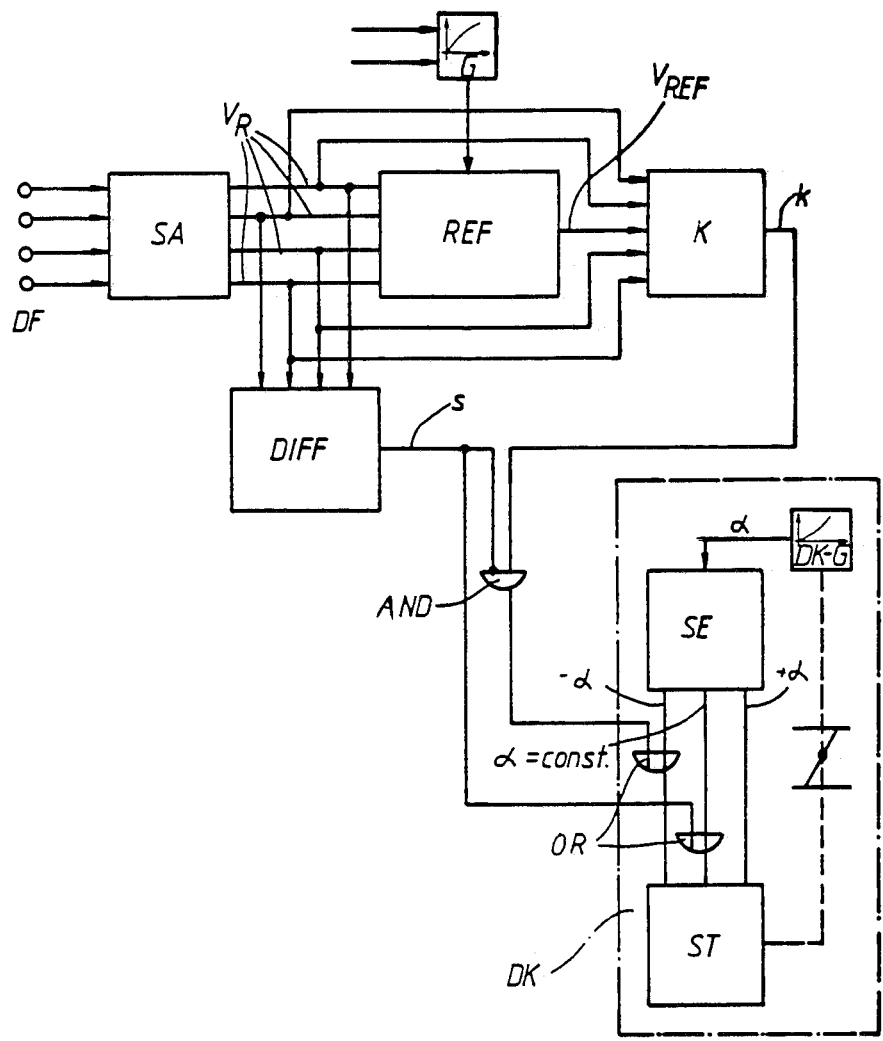
FIG. 1 is a schematic block diagram of an arrangement in accordance with the present invention.

Referring now to the drawing, and more particularly to FIG. 1, an DSR-installation for the wheels of a motor vehicle with permanent or engageable four-wheel drive is schematically illustrated in this figure. The signals DF of the rotational speed sensors of the wheels of the vehicle are fed to a signal preparation circuit SA where they are converted into analog velocity signals $V_R$. Subsequently, the prepared velocity signals $V_R$ are fed to a device REF and to a comparator circuit K as also to a differentiating element DIFF. A driving velocity-reference signal $V_{REF}$ is formed in the device REF from the velocity signals $V_R$ corresponding to the minimum wheel velocity. The signal $V_{REF}$ can change with a predetermined slope during the acceleration of the vehicle; this slope is predetermined in the device REF—as will be described more fully hereinafter—by a signal from the transmitter G. The reference signal $V_{REF}$ is then fed to a comparator circuit K in which it is compared with the velocity signals $V_R$. If a velocity signal $V_R$ exceeds thereby the reference signal $V_{REF}$ by a predetermined difference $\Delta$—corresponding to a predetermined difference velocity—then the comparator circuit K produces an output signal k which is fed by way of an AND element ot the adjusting element ST of a throttle valve control DK. The further illustrated throttle valve control unit SE—which may be a component of an electronic gas pedal—receives a feedback signal $\alpha$ from the throttle valve position transmitter DK-G and supplies the three shifting conditions as output signal "$+\alpha$" opening, "$\alpha=$constant", "$-\alpha$" closing. The signal outputs "$-\alpha$" and "$\alpha=$constant" are each connected by way of an OR element and the output "$+\alpha$" is connected directly with the adjusting element ST. As can be further seen, the output of the AND element is additionally connected with the input of the OR element coordinated to the output "$-\alpha$" so that an output signal k can initially effect a closing of the throttle valve. As already mentioned, the velocity signals $V_R$ also fed to the differentiating element DIFF produce which a blocking signal s when a negative acceleration value derived from the velocity signal $V_R$ exceeds a predetermined negative acceleration value—for example, >0.2 g. This blocking signal s is connected to the inverting input of the AND element whereupon the output thereof blocks. The output signal k can thus effect no further closing of the throttle valve. Simultaneously, this blocking signal s reaches the input of the OR element coordinated to the output "$\alpha=$constant" and can thus keep constant the throttle valve position.

Figure 2:
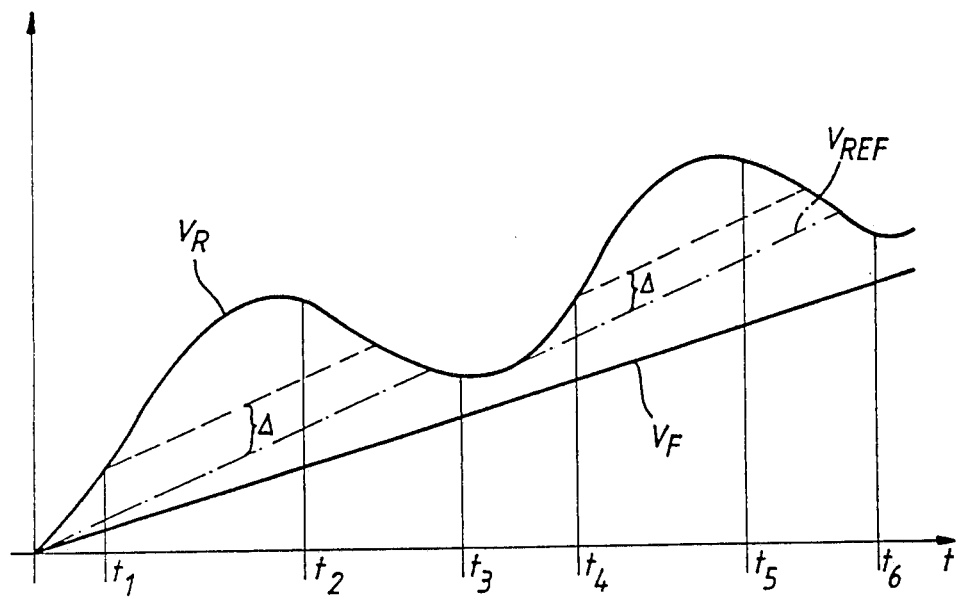
FIG. 2 is a diagram illustrating the curves of the regulation in accordance with the present invention.
Figure 2:
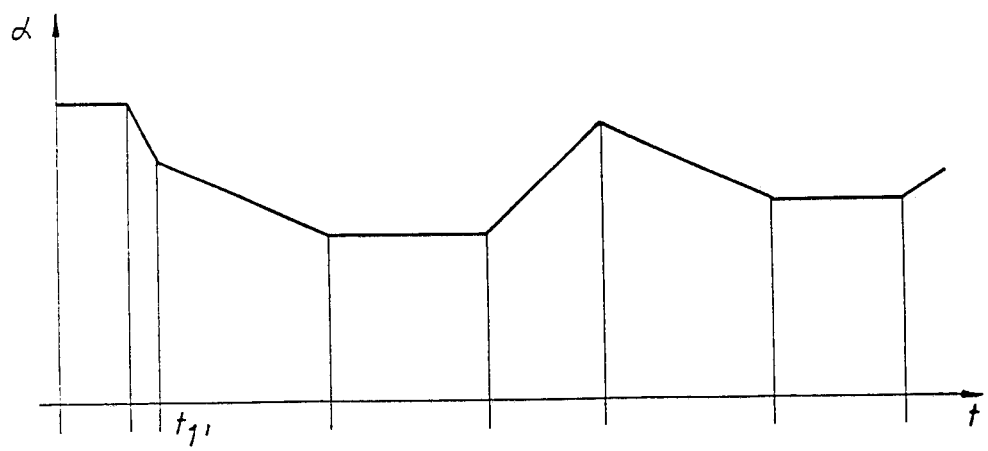

Which FIG. 2—which illustrates the course of the regulation—the variations in time of the vehicle velocity $V_F$, of the wheel velocity $V_R$—for example, of the wheel rotating fastest, of the reference velocity $V_{REF}$ formed from the minimum wheel velocity with predetermined slope and of the difference characteristic curve extending parallel to the reference velocity $V_{REF}$ and increased by the difference $\Delta$ and therebelow. The variation in time of the throttle valve position coordinated to these magnitudes are shown in a simplified manner in this FIG.

Illustrated in a starting operation with four wheel drive and with slipping wheels. The velocity $V_R$ of one wheel deviates thereby very strongly from the vehicle velocity $V_F$. Similarly the reference velocity $V_{REF}$ derived from the minimum wheel velocity deviates from the vehicle velocity $V_F$.

At the instant of time $t_1$, the velocity $V_R$ exceeds the reference velocity $V_{REF}$ by the predetermined difference $\Delta$. The comparator circuit K produces an output signal k which initiates, at the adjusting element ST, a closing of the throttle valve whereby the closing-adjustment is effected in the first regulating cycle by a corresponding shifting device in the adjusting element ST in such a manner that the same takes place rapidly within a first time interval $(t_1' - t_1)$ and more slowly within the subsequent second time interval $(t_2 - t_1')$. The closing of the throttle valve takes place up to the instant $t_2$, at which time a negative wheel acceleration of, for example, $>0.2$ g exists. This is determined by the differentiating element DIFF which applies the blocking signal s to the inverting input of the AND-element and thus blocks the output signal k. However, the blocking signal s also simultaneously reaches the OR-element coordinated to the output "$\alpha$=constant" and now controls by way of the adjusting element ST to maintain constant the position of the throttle valve.

If in the further course of the negative wheel acceleration, a value below the predetermined negative acceleration value is reached, which is the case at the instant of time $t_3$. Then the blocking signal s disappears so that the adjusting element ST is again initiated by way of the output "$+\alpha$" for opening the throttle valve until at the instant of time $t_4$, the next regulating cycle is initiated. As during the regulating cycle phase of the negative acceleration, the velocity signal $V_R$ has also dropped below the reference signal $V_{REF}$. The reference signal $V_{REF}$ is now corrected in the direct REF to the velocity signal existing approximately at the instant of time $t_3$ and corresponding to a smaller mimimum wheel velocity so that for a subsequent regulating cycle, a reference velocity corrected into the range of the optimum friction is used as the base whose slope can differ from the slope in the first regulating cycle. However, in principle, the slope of the reference signal $V_{REF}$ can be determined as follows: In an advantageous manner, a predetermined slope—for example, of 1 g—is predetermined for the reference signal $V_{REF}$ for the first regulating cycle by a base slope signal of the transmitter G whereas for the following regulating cycle, a value derived from the actual vehicle longitudinal acceleration, or taking the same into consideration indirectly, is transmitted as signal from the transmitter G to the device REF. This value may be directly the measured vehicle longitudinal acceleration whereby the transmitter is then constructed as longitudinal acceleration transmitter. This value, however, may also be a calculated average vehicle acceleration which is determined from the velocity change between two or several regulating cycles. Furthermore, the value may be the calculated driving torque of the engine which can be determined from the throttle valve position or the suction pipe pressure, the engine rotational speed taking into consideration the engine performance graph (set of characteristic curves) and the transmission ratio (from engine rotational speed and average rotational speed of the driven wheels).

Even though in FIG. 2 the throttle valve is shown as being kept constant from the instant of time $t_2$ to the instant of time $t_3$ and also is described in such a manner, the phase of keeping constant the throttle valve may be terminated earlier, taking into consideration the dead time in the reaction of the engine torque to the throttle valve adjustment with larger negative accelerations and the opening of the throttle valve can thus be initiated at an earlier instant of time, whereby the earlier instant of time can be calculated from the regulating deviation during the negative acceleration phase, the wheel acceleration and the dead time of the engine.

Consequently, a further method for the formation of a vehicle velocity-reference signal is indicated by the arrangement according to the present invention in which an evaluation of a longitudinal acceleration signal that makes relatively extreme demands, is not required.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for the propulsion regulation in the sense of reducing undesired slippages of the wheels to be regulated in motor vehicles equipped with four-wheel drive, comprising sensor means for determining the movement condition of the wheels, said sensor means producing rotational speed signals which are prepared into velocity signals in a signal preparation circuit means, means for forming a velocity reference signal to which are fed the velocity signals as also a signal of a transmitter means taking into consideration the vehicle longitudinal acceleration, comparator circuit means in which the reference signal is compared with velocity signals from the signal preparation circuit means and which produces an output signal when a velocity signal is greater than the reference signal, the output of the comparator circuit means being operatively connected with an AND-element which, in its turn, is connected with its output to an adjusting means for controlling the driving torque of the vehicle engine, all vehicle velocity signals prepared from the rotational speed signals being fed to the reference-signal-forming means and to the comparator circuit means as also to a differentiating element, the reference-signal-forming means initially forming the reference signal having a predetermined slope, from the velocity signal corresponding to the mimimum wheel velocity, the comparator circuit means producing an output signal when a velocity signal exceeds the reference signal by a predetermined difference which initiates at the adjusting means by way of the AND-element a first regulating cycle for the reduction of the driving torque of the vehicle engine, a blocking signal being present in the output of the differentiating element when a negative acceleration value derived from the velocity signal exceeds a predetermined negative acceleration value, said blocking signal being fed, on the one hand, to an inverting input of the AND-element whereupon the output thereof blocks, and on the other, effects at the adjusting means the keeping constant of the driving torque during the regulating cycle phase of the negative acceleration, upon the disappearance of the blocking signal, when the negative acceleration value falls below the predetermined negative acceleration value, the adjusting means being operable again to increase the driving torque in the direction toward a value specified by a drive pedal, and the reference signal-forming means being operable during the regulating cycle phase of the negative acceleration when the velocity signal drops below the reference signal, to correct the reference signal to the velocity signal corresponding to a smaller minimum wheel velocity with a new slope for the following regulating cycle.

2. An arrangement according to claim 1, wherein the slope of the reference signal is determined by a predeterminable base slope signal of the transmitter means.

3. An arrangement according to claim 2, wherein the slope which in the first regulating cycle is determined by the base slope signal, is corrected in the following regulating cycles by the corresponding signal of the transmitter means.

4. An arrangement according to claim 3, wherein the slope of the reference signal is determined by a vehicle longitudinal acceleration signal of the transmitter means.

5. An arrangement according to claim 3, wherein the slope of the reference signal is determined by an average acceleration signal of the transmitter means determined from the velocity change between at least two regulating cycles.

6. An arrangement according to claim 3, wherein the slope of the reference signal is determined from a signal of the transmitter means formed from the calculated engine driving torque.

7. An arrangement according to claim 1, wherein the slope of the reference signal is determined by a vehicle longitudinal acceleration signal of the transmitter means.

8. An arrangement according to claim 1, wherein the slope of the reference signal is determined by an average acceleration signal of the transmitter means determined from the velocity change between at least two regulating cycles.

9. An arrangement according to claim 1, wherein the slope of the reference signal is determined from a signal of the transmitter means formed from the calculated engine driving torque.

10. An arrangement according to claim 1, wherein the slope in all regulating cycles is determined by the corresponding signal of the transmitter means.

11. An arrangement according to claim 1, wherein the reduction of the driving torque at the adjusting means in the first regulating cycle takes place relatively rapidly within a first time interval and more slowly within a following second time interval.

12. An arrangement according to claim 1, wherein the time interval of keeping constant the driving torque during the regulating cycle phase of the negative acceleration is shortened with occurring larger negative accelerations and the increase of the driving torque in the direction toward the specified value is thus initiated earlier.

13. An arrangement according to claim 12, wherein the earlier point of time for the increase of the driving torque is calculated from the regulating deviation, the wheel acceleration and the dead time of the engine.

14. An arrangement with a throttle valve control according to claim 1, wherein the adjusting means for the control of the driving torque of the vehicle engine is operable on a throttle valve of the vehicle engine.

15. An arrangement according to claim 14, wherein the throttle valve control includes a throttle valve control means, a throttle valve position transmitter means, a feedback signal being fed from the throttle valve position transmitter means to the throttle valve control means, the throttle valve control means supplying at its output three possible shifting signals whereby a first and second output for closing the throttle valve and keeping it constant, repeatedly, are operatively connected with the adjusting means by way of an OR-element and the third output for opening the throttle valve is connected directly with the adjusting means, the output of the AND-element being operatively connected with the input of the OR-element coordinated to the first output of the throttle valve control means and the output of the differentiating element being operatively connected with the input of the OR-element coordinated to the second output of the throttle valve control means.

16. An arrangement according to claim 15, wherein the throttle valve control means is component of an electronic gas pedal.

17. An arrangement according to claim 15, wherein the slope of the reference signal is determined by a predeterminable base slope signal of the transmitter means.

18. An arrangement according to claim 15, wherein the slope in all regulating cycles is determined by the corresponding signal of the transmitter means.

* * * * *